(12) United States Patent
O'Leary et al.

(10) Patent No.: US 7,773,360 B2
(45) Date of Patent: Aug. 10, 2010

(54) FUSE SAVING POWER DISTRIBUTION SYSTEM AND FAULT PROTECTION

(75) Inventors: Raymond P. O'Leary, Evanston, IL (US); Christopher McCarthy, Oak Creek, WI (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 12/026,467

(22) Filed: Feb. 5, 2008

(65) Prior Publication Data
US 2008/0204961 A1 Aug. 28, 2008

Related U.S. Application Data

(60) Provisional application No. 60/888,203, filed on Feb. 5, 2007.

(51) Int. Cl.
*H02H 5/04* (2006.01)
(52) U.S. Cl. ..................................... 361/104
(58) Field of Classification Search ................. 361/104, 361/62, 63, 64, 67, 85
See application file for complete search history.

(56) References Cited

U.S. PATENT DOCUMENTS

| | | | | |
|---|---|---|---|---|
| 5,402,299 A | * | 3/1995 | Bellei | 361/63 |
| 6,101,075 A | * | 8/2000 | Roberts | 361/85 |
| 6,603,649 B1 | | 8/2003 | Muller et al. | |
| 6,667,866 B1 | * | 12/2003 | LaPlace et al. | 361/87 |
| 6,687,573 B2 | * | 2/2004 | Egolf et al. | 700/292 |
| 2001/0034568 A1 | * | 10/2001 | Egolf et al. | 700/292 |
| 2006/0119999 A1 | * | 6/2006 | Lee et al. | 361/62 |
| 2008/0024142 A1 | * | 1/2008 | Opfer et al. | 324/555 |

OTHER PUBLICATIONS

Toth et al., "Enhanced sectionalizing through proper testing of recloser time current curves," Rural Electric Power Conference, IEEE, Apr. 24, 1994, pp. B5-1-B5-7.
International Search Report for Application No. PCT/US08/053064 dated Jun. 26, 2008.
International Preliminary Report on Patentability for Application No. PCT/US2008/053064 dated Aug. 20, 2009.

* cited by examiner

*Primary Examiner*—Stephen W Jackson
*Assistant Examiner*—Angela Brooks

(57) ABSTRACT

Fault protection is provided with fuse saving in a power distribution system. An operating characteristic of a fault protection device protecting a portion of the power distribution system is configured in view of fuse melting characteristics. In this manner, fault protection is provided with fuse saving, when possible, with reduced service disruptions.

28 Claims, 9 Drawing Sheets

FUSE SAVING POWER DISTRIBUTION SYSTEM AND FAULT PROTECTION

CROSS-REFERENCE TO RELATED APPLICATION

This patent claims benefit under 35 U.S.C. §119(e) to U.S. Provisional Application Ser. No. 60/888,203, filed Feb. 5, 2007, the disclosure of which is hereby expressly incorporated herein for all purposes.

TECHNICAL FIELD

This patent relates to the control of an electric power distribution system, and more specifically to a fuse saving system and method for isolating faulted sections of distribution lines.

BACKGROUND

Power distribution systems typically include distribution feeders (ranging from approximately 4 KV to 69 KV) originating in power distribution substations and leading to the source of supply for end customers of an electrical supply utility or agency. Regulatory service provision requirements, cost and competitive pressures create requirements for lower cost, modular, standardized equipment, which can be installed, operated and maintained with minimal labor and human supervision.

Failures of the distribution feeder (faults) occur due to downed power lines, excavation of underground cable or other causes and are typically detectable by sensing excess (short circuit/overcurrent) current, and occasionally by detecting loss of voltage. In distribution systems, it is sometimes the case that a loss of voltage complaint by the customer is the means by which the utility senses the outage in order to respond by dispatching a crew to isolate the fault and reconfigure the distribution system. The typical devices for isolating these faults are circuit breakers located primarily in distribution substations and fuses located on tap lines or at customer transformers. The substation breakers are generally provided with reclosing relays that cause the breaker to close several times after the breaker has detected an overcurrent condition and tripped open. If during any of these "reclosures", the fault becomes undetectable, service is restored and no extended outage occurs. Particularly on overhead distribution lines, temporary arcing due to wind, lightening, etc causes many faults. Thus, the majority of faults are cleared when the breaker opens and service is restored on the automatic reclose. Alternatively, after some number of reclosure attempts, if the overcurrent condition continues to be present, the recloser goes into a "lockout" state which prevents further attempts to restore service.

Although utility acceptance of more sophisticated automation solutions to fault isolation and reconfiguration has been limited but continues to increase, many methods have been developed and marketed. The most primitive methods have typically involved placing control equipment and switchgear at strategic points in the power distribution grid and coordinating their operation entirely with the use of circuit parameters sensed and operated on locally and independently at each point. More sophisticated methods have been developed for isolating/reconfiguring these circuits by communicating information sensed locally at the strategic points to a designated, higher level control entity(s). Utilizing intelligent, distributed control methodologies, several methods have been developed to isolate/reconfigure distribution circuits without the need for the higher-level control entity(s). In systems implementing these methods, information is sensed and processed locally, acted on as much as possible locally, and then shared with other cooperating devices to either direct or enhance their ability to take action. Examples of these methods include versions of the IntelliTEAM® product available from S & C Electric Company, Chicago, Ill.

Systems, such as the IntelliTEAM® products and the systems described in commonly assigned U.S. Pat. No. 6,697, 240, the disclosure of which is hereby expressly incorporated herein by reference, provide methodologies and related system apparatus for using and coordinating the use of information conveyed over communications to dynamically modify the protection characteristics of distribution devices (including but not limited to substation breakers, reclosing substation breakers, and line reclosers). In this way, overall protection and reconfigurability of the distribution system or "team" is greatly enhanced. Devices within the system recognize the existence of cooperating devices outside of the team's domain of direct control, managing information from these devices such that more intelligent local decision making and inter-team coordination can be performed. This information may include logical status indications, control requests, analog values or other data.

Still, when restoration systems reconfigure distribution feeders, for the purpose of fault isolation and/or load restoration, the coordination between fault protection devices, such as interrupters, used to segment the feeder, can be destroyed. Thus, an automated method to reconfigure the protection settings to maintained coordination is desired. Further, benefits may be obtained where the fault protection devices are set so they coordinate with other devices that may or may not automatically set, for example, boundary devices such as circuit breakers that protect the distribution feeder and fuses that protect loads that are tapped off the feeder.

In some instances, where a fault current exceeds a melting current of a fuse protected distribution line, fault interruption followed by automated restoration may lead to service restoration if the fault is transient; however, service disruptions followed by inevitable service loss with the fuse melting may be the result for persistent faults or sufficiently high current faults. This may be particularly true for loads extending from the distribution line between the fuse and the fault protection device.

DETAILED DESCRIPTION

A fault protection system for an electrical power distribution system and a method of configuring and operating a fault protection system for an electrical power distribution system accepts device fault protection parameters, such as the time-current-characteristics (TCC's), of boundary devices, and selects and sets fault protection parameters for one or more fault protection devices, such as fault-interrupters, that thus coordinate with the boundary devices. Fault protection parameter selection for each fault protection device may occur automatically, and each device may reconfigure its fault protection parameters based upon changes in the electrical power distribution system, for example, as the result of fault isolation and/or service restoration.

Figure 1:
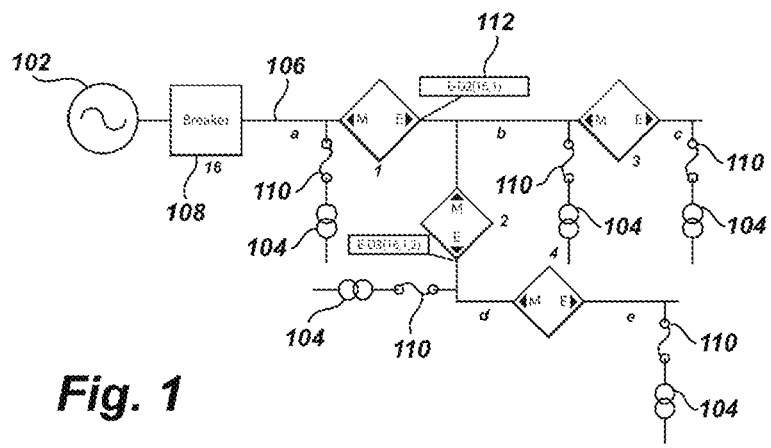
FIG. 1 schematic diagram illustrating a portion of an electrical power distribution system incorporating configurable fault protection devices.

FIG. 1 shows a simplified view of a portion of an exemplary electrical power distribution system that includes fault protection devices that can be configured and controlled by one or more of the herein described embodiments. The distribution system comprises a plurality of sources of electrical power, one shown as source 102, connected to a plurality of users or loads 104 (e.g., factories, homes, etc.) through an electrical distribution line 106 such as conventional electrical power lines.

Distribution line 106 has a plurality of fault protection devices, devices 1, 2, 3 and 4 placed at predetermined points along the line 106. The depiction of the number of sources, users, lines and devices in FIG. 1 is arbitrary and there may be many different configurations and virtually any number of each of these components in any given distribution system. Also depicted are a number of boundary protection devices including breaker 108 and fuses 110.

Figure 2:
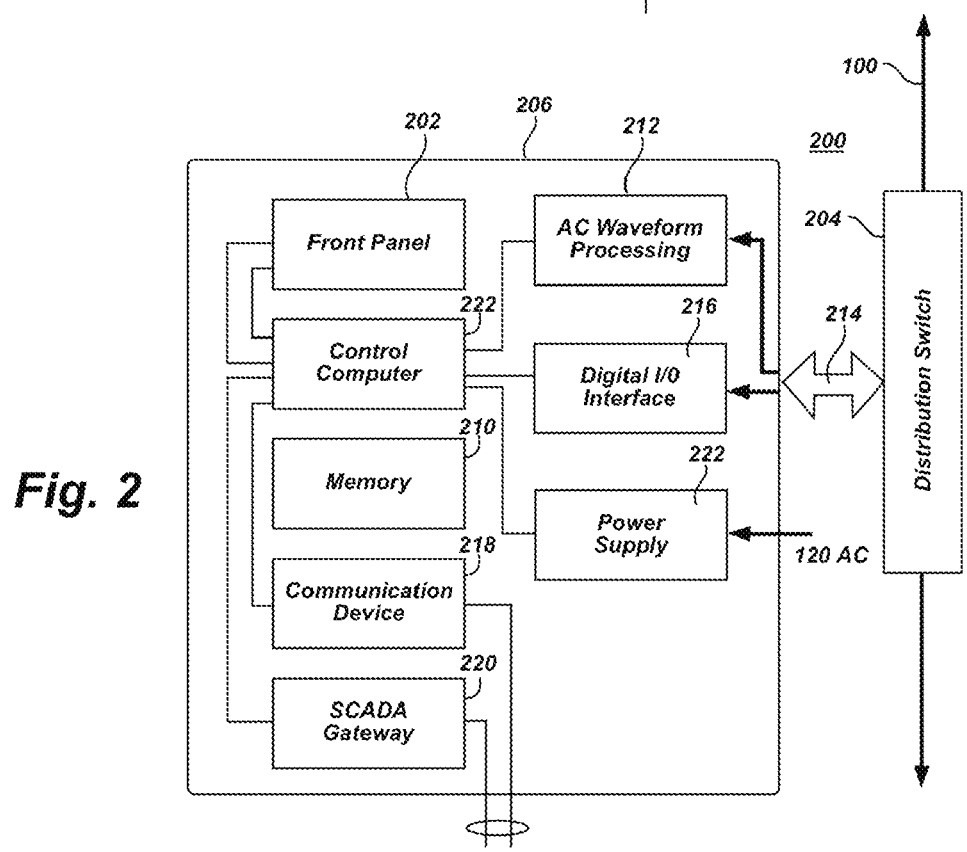
FIG. 2 is a block diagram of a fault protection device.

FIG. 2 illustrates an embodiment of a fault protection device 200. A distribution line, such as line 106, passes through a fault isolation operator, e.g., a switch 204, which can open and close the distribution line 106 at this point to isolate a fault in the line from the source. In other embodiments, the fault isolation operator may be any suitable device or devices capable of performing power sensing, control or conditioning functions such as voltage regulation (voltage regulators), reactive power control (switched capacitor banks), fault sensing, etc. in conjunction with fault isolation. It will be appreciated that the device 200 may also be of a type for controlling two (dual), three, or more switches, with customer loads or alternate sources between the switches. In this case, the distribution line or lines 106 would pass through two or more switches 204 which can open and close independently under the control of the single device 200. In this context, device 200 is a single device from the standpoint of communications, but is multiple devices from the standpoint of the power system and the control and fault protection algorithms. In this circumstance, the information flow is unchanged, but the communication step is simply bypassed.

A controller 206 controls the distribution switch 204. The controller 206 includes a control computer or suitable processing device 208, a display 202, and an associated memory 210. The memory 210 may store, among other data, the programming to control the device 200, programming to determine configuration and performance data, the configuration data for the device, and a database of device records relating to other devices in the system.

Those skilled in the art will recognize that distribution switch 204 can have different operating capabilities which may enhance or detract from its ability to participate in circuit reconfiguration. For example, the lowest-cost switches may not be capable of interrupting high currents, or may not be outfitted with both voltage and current sensors. Those skilled in the art will also recognize that the device 200 may be programmed not to open the switch under high interrupting currents (sectionalizing switch control), or alternatively may be programmed as a "circuit protective device" (recloser or breaker). When programmed as a protective device, the switch is controlled in accordance with operating parameters such as fault protection parameters. For example, the switch, if normally closed, may be opened under overcurrent conditions (fault current) to prevent fire or damage to the circuit or to customer equipment, and also for safety concerns.

The distribution switch 204 may also be a number of switches, independently operable on each of a plurality of phases of the power distribution system. Alternatively, a fault protection device 200 may be provided for each phase of the multi-phase power distribution system with their operation being coordinated. Operation of the fault protection device 200 and/or the distribution switch(s) 204 to provide single-phase or multiple-phase operation may be set within the controller as a user settable parameter or as a result of an operating logic for the device 200. For example, the device 200 may be configured to provide on initial operation single-phase tripping of each faulted phase, e.g., one, two or more phases. Such operation isolates the fault on the single phase while at the same time preserving a level of service via the remaining, non-faulted phases which are not opened. A subsequent fault clearing operation on one or more phases may then trigger isolation of all phases to prevent single phasing of loads. One will appreciate that various strategies of operating on a single phase, multiple phases or all phases may be employed to provide effective fault isolation with minimal service disruption.

The control computer 208 is connected to an AC waveform processor 212. The AC waveform processor 212 is connected through a field interface connector 214 to the distribution line 106. This allows the processor to measure various parameters of the electricity on the distribution line 106 such as, voltage and current, digitally convert them, and send them to the control computer for processing, communications, or storage in memory.

The digital I/O interface 216 is connected to the control computer 208, the switch 204 and the distribution line 106. The digital I/O interface 216 allows the controller 206 to receive switch position sensing information and other inputs, and to output control outputs to the switch.

The communications device 218 is connected to the control computer 208 and allows it to communicate with other devices on the system through suitable communications channels. The communications device 218 can be connected to any communications network that is conveniently available and has the desired characteristics. For example, a Metricom Radio network may be used. An optional communications device 220 may be included in the device 200. An example of such a secondary communication option may be a SCADA gateway. Power is supplied to the device 200 through a power supply/battery backup 222. The battery can be charged from solar power, an AC potential transformer, or from power supplied through the voltage sensors.

Each of the devices 200 is connected to a suitable communications channel (not depicted). Any type of communications channel can be used. For example, the communications channel may be telephone, radio, the Internet, or fiber optic cable.

The fault operating parameters of the devices 200 may be set so that operation of each individual device 200 in accordance with the fault operating parameters coordinates with the other devices and boundary devices such as breakers that protect the distribution feeder(s) and fuses that protect load(s) that are tapped off of the feeder. That is, the fault operating characteristic of each of the devices 200 is based upon one or more fault protection parameters set within the device. The fault protection parameters may be selected in relationship to the other devices in the system, and particularly devices that do not have adjustable or settable fault protection characteristics, so that operation of the fault protection device coordinates with operation of the other devices to better facilitate fault isolation and service restoration. For example, the fault protection operating characteristics of the device 200 may include a time-current-characteristic (TCC) operating curve that is established at least in view of TCC curves associated with boundary devices within the system and potentially other fault protection devices within the systems.

Figure 3:
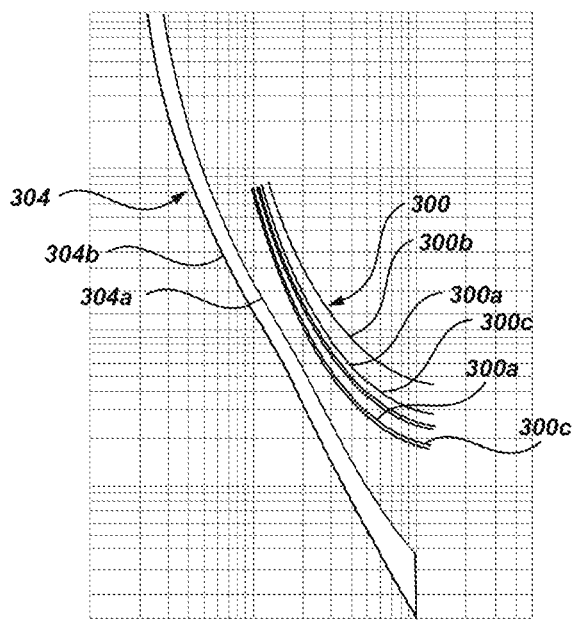
FIG. 3 is a plot illustrating time-current-characteristics for devices of an electrical power distribution system that may be used to configure fault protection devices.

FIG. 3 illustrates exemplary TCC curves that may be used to establish the fault protection parameters and hence the fault operating characteristics of the device 200. FIG. 3 illustrates a TCC curve 300 for a substation breaker, such as breaker 108 shown in FIG. 1. The curve 300 illustrates three different characteristics of the breaker 108. The curves 300a, 300b and 300c make up the complete TCC 300 for the breaker. 300a is the nominal response time of the breaker. 300b is the maximum time to clear for the breaker. 300c, is the minimum response of the breaker and is the maximum time limit that a downstream device can take to clear any current before the breaker operates. TCC 302b, which takes into account tolerances of the current sensors, control, the fault-interrupter, and the load that may be tapped between the breaker and the fault-interrupter and a desired margin, is the maximum time to clear for the fault protection device.

To coordinate with the breaker, a fault protection device may have a TCC such as that illustrated by the TCC 302 depicted in FIG. 3. The curve 302 illustrates the nominal characteristic of the fault protection device 302a, its maximum time to clear 302b and its minimum response, 302c. The maximum time to clear 302b may be selected to be below the minimum response of upstream devices, such as the breaker, and as shown in FIG. 3 the maximum time to clear 302b is set below the minimum response 300c of the breaker. The band between the minimum response 302c and the maximum time to clear 302b is a function of the operating characteristics of the fault protections devices, and may generally be made to be tighter than the upstream device by providing accurate sensing, electronic control and a fast interrupter.

In addition to coordination with upstream devices, the fault protection device may be made to coordinate with downstream devices, such as fuses. To coordinate with a downstream device, the minimum response of the fault protection device should be longer than the maximum clearing time of the downstream device. FIG. 3 illustrates a TCC curve 304 for a fuse device having a maximum clearing characteristic illustrated by the curve 304a and a minimum clearing characteristic illustrated by the curve 304b. As can be seen from FIG. 3, the minimum response 302c of the fault protection device is longer than the maximum clearing time 304a of the downstream device, in this example, a fuse.

It is possible to specify the TCC of a fault protection device as a function of the characteristics of the device and the devices with which it will coordinate. Exemplary device characteristics may include: curve type (e.g., inverse, very inverse, U/C 1 through 5, etc.), time dial setting, minimum pickup current and coordination requirements. The coordination requirement may take the form of a coordination time interval (CTI) or device tolerances such as relay tolerance, current transformer (CT) tolerance and relay over-travel characterstics. Expressed as a function, the TCC may be stated as:

$$t = TD \cdot \left[ \frac{k}{(I/I_{pu} - 1)^a} + c \right]; \quad (a)$$

where TD is the time-dial setting; $I_{pu}$ is the minimum pickup current; and the constants k, α, and c determined by the specified relay curve.

The fault protection device TCC of a downstream device assumes the same shape (i.e., the constants, k, α, and c are the same). However, the pickup current and time-dial are reduced by a factor, to ensure coordination and shifted in time (down), to account for the clearing time of the device, margin, and any minimum or fixed tolerance. Thus the fault protection device TCC will have the form:

$$t = TD' \cdot \left[ \frac{k}{(I/I'_{pu} - 1)^a} + c \right] - TS. \quad (b)$$

The constants k, α, and c are the same as root TCC set forth in equation (a). TD', $I'_{pu}$, & TS depend on the factors set forth in Table 1.

TABLE 1

| Parameter | Determining factors |
| --- | --- |
| $I'_{pu}$ | relay/control current tolerance of the device and the upstream device<br>CT/sensor tolerance of the device and the upstream device<br>Load current effect |
| TD' | relay/control time tolerance of the device and the upstream device |
| TS | fixed or minimum time error of the device and the upstream device<br>maximum device interrupting time<br>margin |

Alternatively, a fault protection device TCC may be specified as a set of data that define the nominal TCC curve. In this case, the fault-interrupter TCC is expressed as a corresponding data set from points of the breaker TCC modified by multiplying by a current & time factor and additionally subtracting a time-shift term. The factors and time-shift term may be determined as set forth in Table 2.

TABLE 2

| Constant | Determining items |
| --- | --- |
| Current factor | relay/control current tolerance of the device and the upstream device<br>CT/sensor tolerance of the device and the upstream device<br>Load current effect |
| Time factor | relay/control time tolerance of the device and the upstream device |
| Time term | fixed or minimum time error of the device and the upstream device<br>maximum device interrupting time<br>margin |

Once a fault protection device curve is generated, its useability must be validated. With respect to load protection coordination, the relevant range of current is defined by the minimum operating current of the device and the maximum available fault current. For all currents in the relevant range, if the minimum operating time of the fault protection device is greater than the maximum clearing time of the load protection device, the fault protection device TCC is valid. Additionally, with respect to inrush current withstand capability, if the minimum operating time of the fault protection device at a specified multiple of the minimum operating current is less than a time value, the TCC is invalid. In connection with the fault protection device 200, after determining the device TCC, the controller may check the validity of TCC and provide a warning or indication by communicating a message via the communication device 218 or provide a message in to the display 202.

Figure 4:
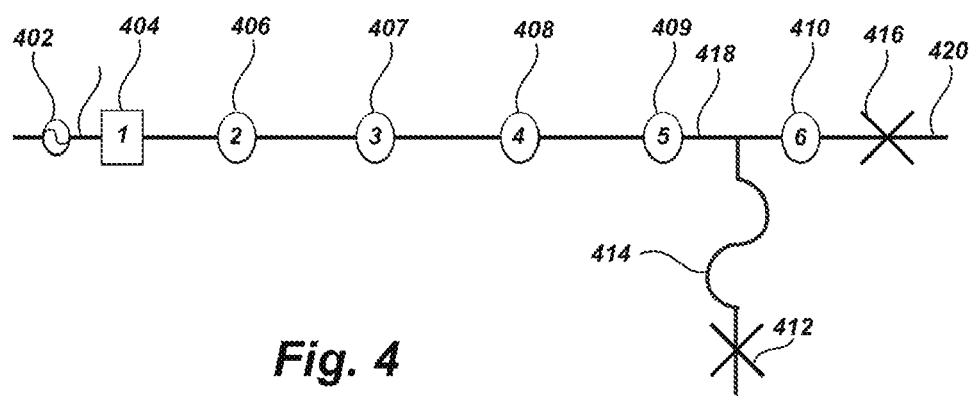
FIG. 4 is a schematic diagram illustrating a portion of an electrical power distribution system incorporating a series of fault protection devices.

The method may be repeated to generate a TCC for each of several series fault protection devices. FIG. 4 illustrates a series of fault protection devices, e.g., fault interrupters, 406-410 segmenting a feeder line 400 coupled to a source 402 via a source protection device, e.g., breaker 404. Loads, e.g., load 412 protected by fuse 414, may extend laterally from any of the segments.

Figure 5:
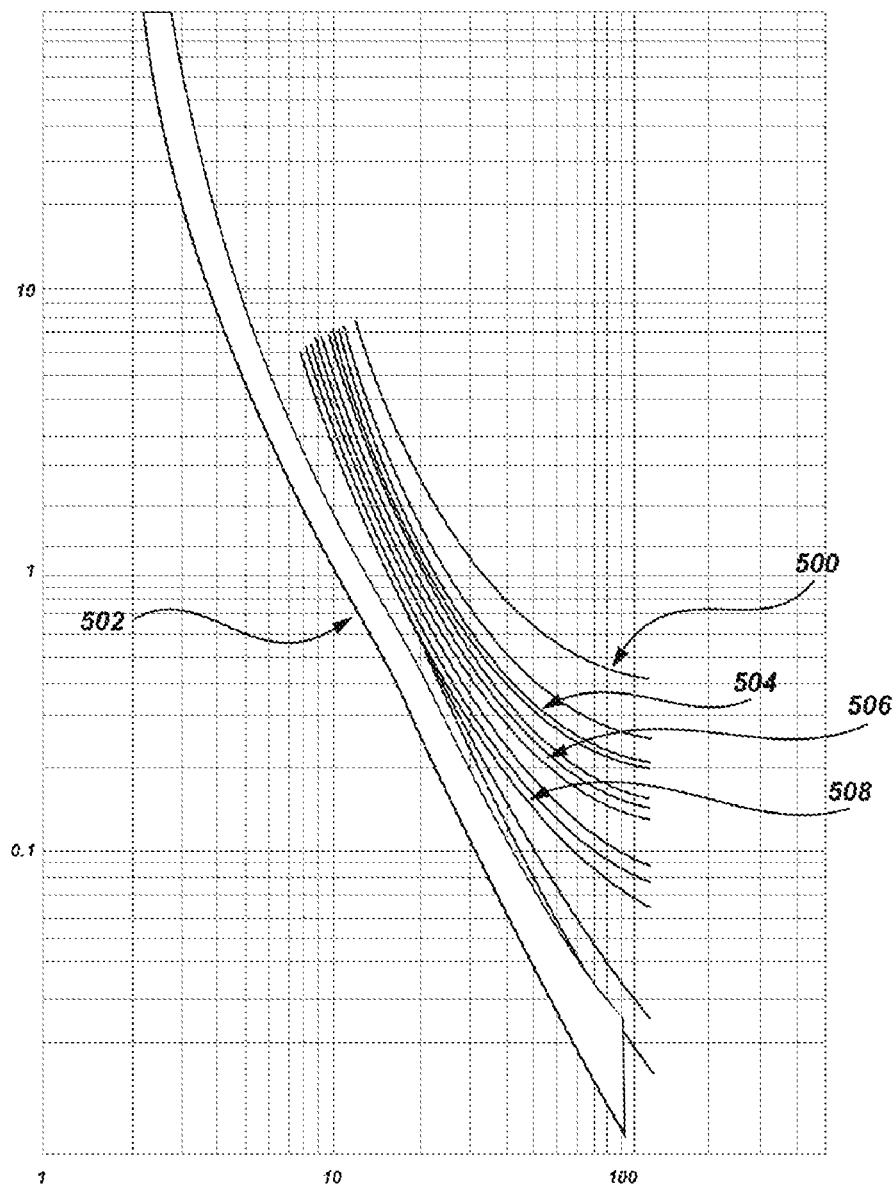
FIG. 5 is a plot illustrating time-current characteristics for devices of an electrical power distribution system incorporating series arranged fault protection devices.

FIG. 5, illustrates fault protection characteristic curves, i.e., the TCC of several of the fault protection devices disposed between a source protection device and a load protection device. As shown in FIG. 5, the TCC 504, 506 and 508 for a plurality of fault protection devices is disposed between the breaker TCC 500 and the fuse TCC 502. Provided any given fault protection device TCC resides between the upstream device TCC and the downstream device TCC, the fault protection device TCC is considered valid. At some point, however, the generated TCC for a fault protection device will no longer coordinate with the downstream fuses, and as illustrated in FIG. 5, the TCC 508 includes a portion that overlaps the fuse TCC 502. Under this circumstance, several supplemental coordination methods may be utilized. This is described following the discussion of a method 600 (FIG. 6) to generally coordinate fault protection devices.

Figure 6:
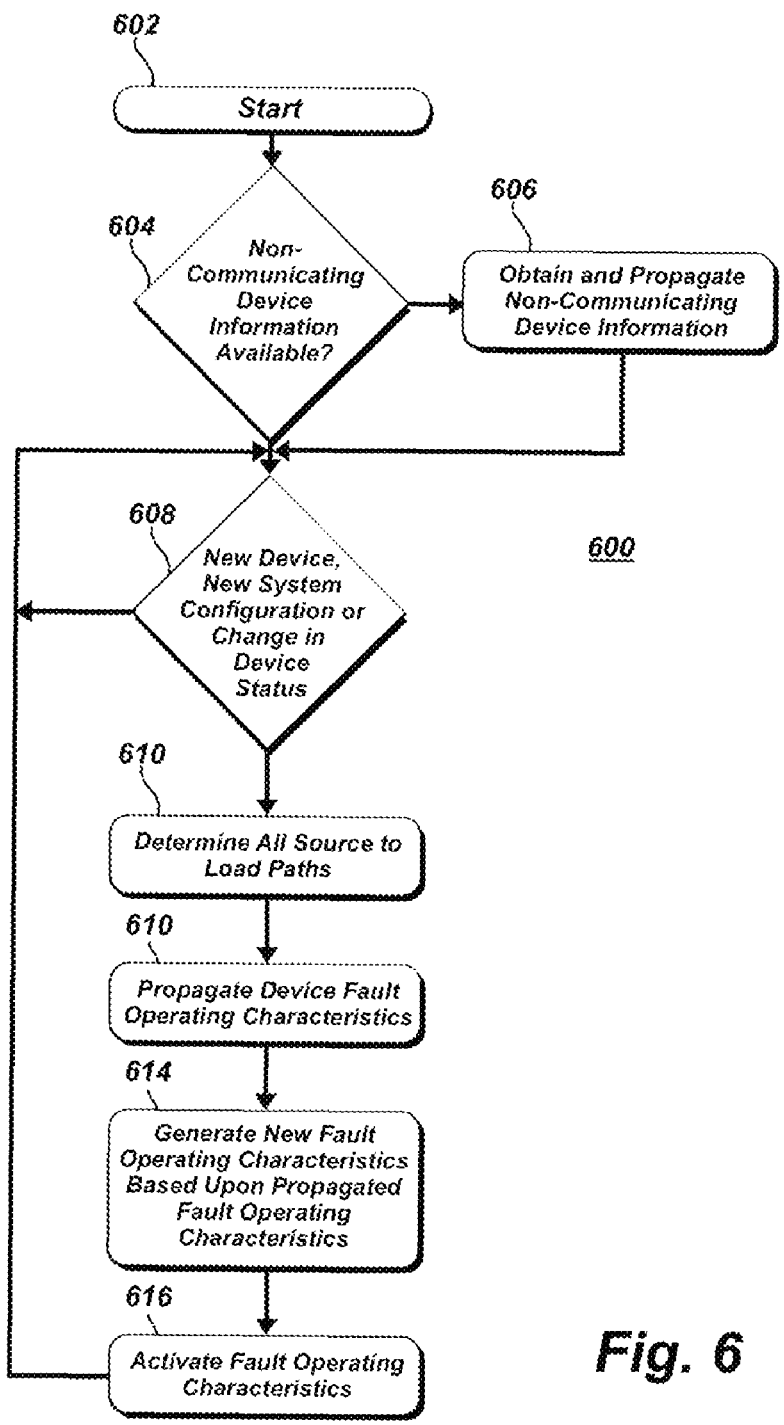
FIG. 6 is a flow diagram illustrating a method of configuring fault protection devices in an electrical power distribution system incorporating series arranged fault protection devices.

Given the system of fault protection devices 406-410, each having suitable communication capability, such as that described above in connection with the device 200, fault protection characteristics for each device may be coordinated between the fault protection devices and any boundary devices. FIG. 6 illustrates in flow chart form a method 600 of coordinating fault protection devices. The method has application to systems with multiple sources and loads. Each device preferably includes a control program stored in its memory to allow it to operate to automatically generate fault protection characteristics.

For the method 600, it is assumed the boundary devices, e.g., breakers, fuses, and the like, do not have communication capability and are unable to communicate to other devices in the system their respective fault protection characteristics, such as the their TCCs. Boundary fault protection characteristic information is therefore loaded into the communication capable fault protection devices. It may be sufficient to load the boundary fault protection characteristic data to a single communication capable fault protection device and the information propagated from that device, or the information may be loaded to each individual fault protection device. Moreover, non-communication capable devices are not limited to boundaries. In such a case, the fault protection characteristics of the non-communicating, non-boundary fault protection device is also loaded and propagated. This process is illustrated in FIG. 6 at blocks 604 and 606.

With the non-communicating fault protection device information loaded, fault protection characteristic propagation to all communication fault protection devices occurs each time a communicating fault protection device is installed, the system is reconfigured or a status of a fault protection device changes, 608. Given a system configuration, all possible paths from sources to loads are considered as a default, 610. Fewer than all possible paths may be considered, and if certain paths are to be excluded, such information may be retained within the fault protection devices and/or communicated to the fault protection devices.

Each active, communicating fault protection device propagates its own fault protection characteristics to each other communicating fault protection device. Fault protection devices with closed paths back to a source may be considered active. The active status of a fault protection device may therefore change based upon the opening or closing of another fault protection device, thus creating or breaking a path to a source for that fault protection device.

As noted above at 608-612 of the method 600, propagation of fault protection characteristics occurs whenever a fault protection device is installed in the system, the system is reconfigured or a fault protection device changes its status. The propagation may occur by having a fault protection device send its fault protection characteristic information to the fault protection devices connected to it. When a fault protection device receives a fault protection characteristic it may generate a new fault protection characteristic based upon the received information, 614 and proposed the new fault protection parameters. Prior to proposing the new fault protection parameters, however, it may check to ensure that further propagation will not create a looped path, and during propagation the fault protection device may add its name to the path back to the source. Referring to FIG. 1, each fault protection parameter may carry a designation 112 that identifies the fault protection device, the directionality of the fault protection parameter, the source name, the number of devices in the path back to the source and the names of the devices in the path back to the source. After generating the new fault protection parameter, it then propagates the newly generated fault protection parameter to fault protection devices connected to it. It will also propagate its own close or open status.

All fault protection devices in a closed path to a source are considered active and activate an appropriate fault protection parameter, 616. A fault protection device may have multiple paths to a source or to multiple sources. The fault protection device may determine a fault protection parameter for each possible path and for each possible direction of the path back to the source. Additionally, each fault protection device may have multiple terminals. Separate fault protection parameters may be established for each terminal of the fault protection device. Thus, each fault protection device may have more than one fault protection parameter associated with it based upon the number of paths and direction of paths back to sources as well as the number of connected terminals with paths back to sources. In implementing any one of the possible fault protection parameters, the fault protection device may implement the most onerous fault protection parameter, typically the fault protection characteristic providing the fastest fault protection response time.

The process of automatically updating fault protection device parameters repeats responsive to installation of new devices, changes in the system configuration, a change in the status of one or more fault protection devices, for example, as a result of a fault protection device operating to isolate a fault or to restore service, 610. In this manner, the operation of the fault protection devices remain continuously coordinated.

The fault protection devices may include programming and implement functionality to allow a predicted status to be propagated just prior to the device changing to that status. For example, if the device is open and is about to close, it may propagate its closed status before closing thus causing a system-wide coordination of the fault protection devices prior to its actual closing. Furthermore, status of fault protection devices may periodically propagate their status, again causing a system-wide coordination update, thus correcting any errors.

FIG. 5 illustrates how fault protection characteristics, i.e., TCCs of several fault protection devices may be precisely fit between the corresponding TCCs of a source device and a load device. However, the TCC 508 overlaps the load device TCC 504, and thus does not provide the required coordination, and is invalid. In this instance, the device associated with the TCC 508, e.g., with respect to FIG. 4 the device 410, may check the next preceding device, e.g, the device 409 associated with the curve 506. Because the TCC 506 does coordinate, the TCC 506 may be adopted by the device 410 in place of the TCC 508. While the device 410 is now coordinated with the rest of the system, it is no longer coordinated with the device 409. However, additional capability may be provided to ensure coordination between the devices 409 and 410 using the same TCC 506.

An approach to provide coordination between fault protection devices using the same or substantially similar TCCs is to use the communication capability of the fault protection devices. In one possible scheme, all fault protection devices that detect a fault signal the next upstream fault protection device. Referring again to FIG. 4, the devices 409 and 410 may share a TCC, e.g., TCC 506, and both detect the fault 416. The device 410 may signal the device 409 to delay it fault protection operation, which has the affect of shifting in time its TCC curve. Thus, coordination is provided between the device 409 and the device 410 because the device 409 implements its fault protection operation only after the device 410 operates. With the devices 409 and 410 coordinated, the device 409 and 408 may no longer be coordinated as the TCC of the device 409 is time-shifted toward that of the device 408. Thus, the device 409 will signal the device 408 to delay, similarly shifting in time its TCC. Generally, a device that receives a delay command signals the next upstream device with a second delay command. In fact, first, second and up to "N" delay commands, were "N" is the number of devices sharing a TCC following a last unique TCC may be employed to ensure coordination back to the source 402. As a result of the first, second, and/or N delay commands, only the device 410 operates to isolate the fault. As will be appreciated, the time of the communication of the delay command must be less than the minimum response time for the fault protection device to ensure the delay command(s) is received before the fault protection device trips. The minimum response of the shared TCC's must be greater than the time to communicate the delay command. In the example in FIG. 5, the time to communicate the delay command must be less than about 0.08 seconds. Alternately TCC 506 could be made to flatten out at a time greater than the time to communicate the delay command, if it were to be greater than 0.08 seconds.

As appreciated from the foregoing discussion, fault protection devices may be coordinated essentially by staggering the fault protection characteristics of the devices in a path from a source to a load such that the response time of the device closest so the fault will clear the fault faster than the response of any upstream device. Device coordination can be problematic as additional fault protection devices are added in series between a source and a load, but, as described above, the communication capability of the fault protection devices themselves is advantageously used to facilitate coordination between devices where coordination of a series devices results in two or more devices having the same fault protection characteristics. In an alternative approach, two or more devices may be configured to operate in tandem or as a team to provide the necessary coordination and hence the desired fault protection response. Using tandem or team operation allows series devices to provide the intended fault isolation and still achieve coordination with existing upstream circuit breakers or downstream fuses.

There are also occurrences on installed systems where series devices might miscoordinate for a number of reasons such as improper settings, tolerances on the fault relay, loss of communication signals, etc. As noted above, this may be addressed by having the fault protection devices periodically propagate their status and fault protection characteristics resulting in the automatic recoordination of the devices. The tandem or team operation of devices can also be evoked in these situations to improve overall system operation, again, by ensure isolation of only the faulted segment even when device miscoordination should exist.

Referring again to FIG. 4, each section of the feeder 400 has its own fault protection device, i.e., fault protection devices 406-410. From each of these sections there may extend lateral loads that are protected by fuses, such as the load 412 protected by the fuse 414 extending from the section 418. The load 412/fuse 414 combination is exemplary, and while not depicted in FIG. 4, additional load/fuse combinations may extend from any or all of the other sections as may non-fuse protected loads. Furthermore, as described above, it may necessary that the fault protection devices 409 and 410 have the same fault response characteristics, e.g., to ensure coordination with downstream load protection devices.

The following described method allows the inclusion of multiple series fault protection devices with a predetermined and known operating sequence to isolate a single faulted section. The device 410 may be set to operate with the same fault protection characteristics, e.g., the same TCC, as the device 409. Operating and reclosing logic may be applied by the fault protection devices 409 and 410 to ensure that only the proper device remains opens for the fault 416.

A fault 412 in the section 418 between the device 409 and 410 would be seen by the device 409 and it would appropriately open. The device 410 would not respond since it did not see a fault, e.g., an over current. Should the fault 412 in the section 418 be a "temporary fault" that would be cleared by the initial operation of the device 409, the device 409 could be set to reclose to thereby reenergize both sections 418 and 420, providing the minimum outage time for the fault scenario. No special logic needs to be implemented in the devices 409 and 410 even though each may have the same fault protection parameters.

The fault 416 in the section 420, as indicated in FIG. 4, may be addressed by having the fault protection devices 409 and 410 implement response logic. Several scenarios are possible. Note that even though both the fault protection devices 409 and 410 are set to operate on the same fault protection parameters, there are inherent tolerances in each of the devices such that for the same fault current, either device may operate before the other one, or both devices may operate essentially simultaneously. It is likely not possible to eliminate these inherent differences in the devices themselves, and the logic may be adapted to respond to these various scenarios.

EXAMPLE 1

The devices 409 and 410 detect the fault current, and the device 410 trips and clears the fault current before the device 409 trips. This is the desired mode of operation, and no further logic is needed. The device 409 would have knowledge of a downstream fault cleared by another protective device but does not need to take any further action.

EXAMPLE 2

The devices 409 and 410 each sense the fault current and essentially trip simultaneously to clear both sections 418 and 420. Both devices 409 and 410 are set to reclose and test the circuit. The device 410, however, saw an overcurrent and tripped the interrupter, but also saw a loss of voltage due to tripping of the device 409. The device 410 may be configured to not attempt to reclose until voltage is restored on the source side. The device 409 would perform its reclosing operation and energize section 418, which has not faulted and would restore voltage to the terminals of the device 410. The device 410, upon detecting voltage, may then reclose to test the circuit for a fault in the section 420. Service is restored to the section 420 if the fault 416 is temporary, and therefore, there is no fault detected when the device 410 recloses. If, however, the fault 416 is persistent, the device 410 would interrupt the fault and continue with its test/reclose sequence. The device 409 does not operate during the test sequence for one of the following two reasons.

1. When conducting the test sequence, the device 410 may use a "pinging" type test, such as described in the commonly assigned International Patent Application (PCT) Entitled "Fault Interrupting and Reclosing Device" Serial No. PCT/US2006/038472, filed Oct. 4, 2006, the disclosure of which is hereby expressly incorporated herein by reference. As only a momentary pulse of current is used to test the line sections, the device 409 would not "see" the test current; and therefore, would not timeout on its fault protection parameters. In this fashion, coordination would be achieved between the devices 409 and 410 while device 410 tests the segment 420.
2. If more conventional reclosing is used where the device 410 reenergizes the segment 420 to test with an extended fault current, the device 409 may be configured to shift to a slower fault protection parameter set given that the knowledge of tripping on a measured fault current and successfully closing to restore service to the segment 418. The slower fault protection parameter set provides the coordination necessary between the devices 409 and 410. For example, if both devices are set to a common TCC, the device 409 after clearing the initial fault and reclosing successfully, would shift the TCC in time a delay period equal to or greater than the reclose sequence assigned to the device 410. In this way, the device 409 temporarily delays its response in order to achieve coordination for faults in the section 420.
3. Alternately, when reclosing, device 410 could adopt a faster TCC to avoid tripping device 409.

EXAMPLE 3

The device 409 clears the fault 416 before the device 410 trips. The device 410, however, will sense an overcurrent but prior to reaching its trip settings, the device 410 will see a loss of source voltage. Using this information, the device 410 may automatically open and go into an operating mode as described in Example 2 above. If necessary based upon the test procedure implemented by the device 410, the device 409 would appropriately adjust its time fault protection response or not.

Overall, two fault protection devices can be set to operate as a team or in tandem to provide clearing of the appropriate faulted section even when the responses must be set to the same or nearly the same fault protection parameters in order to coordinate properly with upstream and/or downstream devices. This same operating scenario may be used in conditions where there is an unintended miscoordination, for example, the fault protection parameters on the device 409 are set incorrectly faster than those of the device 410.

An additional operating consideration for fault protection devices and an advantage of the herein described fault protection systems is that they may be configured to provide fuse saving. That is, the fault protection device may be configured to operate to isolate a faulted segment before a line protecting fuse melts, i.e., the fault protection device does not operate in coordination with the fuse. The fault protection device may then operate in an automated manner to restore service or to lock-out to isolate the faulted segment until repairs can be affected should the fault be upstream of the fuse. However, for a sufficiently large fault or a persistent fault, operation of the fault protection device and potentially automated service restoration, which may use short periods of reenergization or line pinging, as described above, can cause service disruptions to loads that would otherwise be unaffected by the fault. Thus, the fault protection operating characteristic, while taking into account fuse saving, should also be made to reduce service disturbances to customers, and particularly those located between the fuse and the fault protection device.

Figure 7:
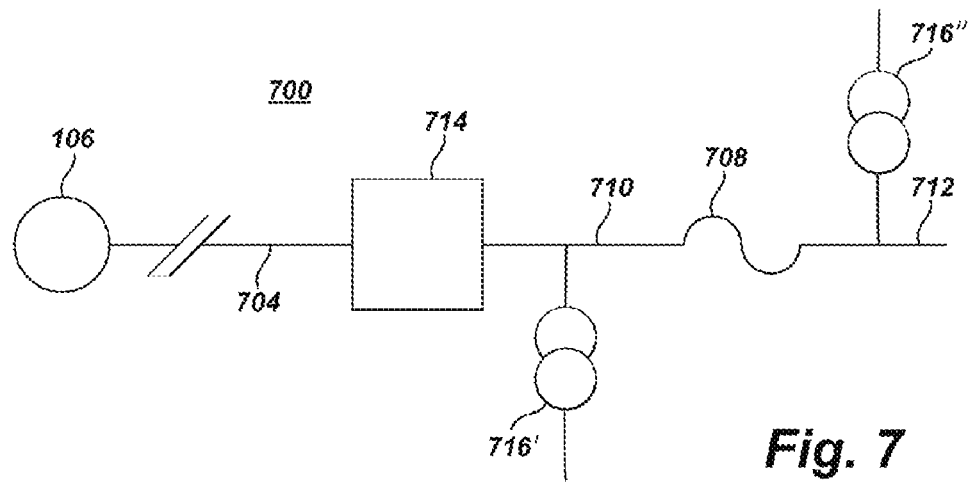
FIG. 7 is a schematic diagram illustrating a portion of an electrical power distribution system incorporating fuse saving.

While fuse saving device coordination as will be described is applicable to and may be adapted to any of the herein described embodiments, FIG. 7 is a schematic of a power distribution system 700 including a power source 702 coupled to a distribution line 704 that may illustrate fuse saving with reduced service disruptions. The power source 702 may be protected by a suitable source protection device, e.g., circuit breakers and the like (not depicted in FIG. 7, but generally illustrated in the embodiments shown in FIGS. 1 and 4). The line may be segmented into a first segment 710 feeding loads 716' and a second segment 712 feeding loads 716" by a fault protection device 714, with loads 716" in the second segment 712 further being protected by a fuse 708. Similar in concept, as shown in FIG. 4, loads may extend laterally from the distribution line with such lateral loads being fuse protected, e.g., fuse 414 protecting lateral load 416 which are downstream of fault protection devices, e.g., devices 406, 407, 408 and 409. The fault protection device 714 may be configured much like that described above in connection with the fault protection device 200. Loads 716' extend from the first segment 710 and loads 716" extend from the second segment 712. While shown as a single distribution line, one will appreciate that there is likely to be at least three lines associated with a three phase power distribution system each being configured as described in connection with FIG. 7. Furthermore, while the fuse 708 and the fault protection device 714 are shown as separate elements, the physical structures and/or the functionality may be combined, and furthermore, these devices may be combined with other equipment such as switches, segmenting devices and the like.

Typically, the fault protection device 714 will operate to isolate faults in the second segment 712, and preferably before the fuse 708 melts persistently disrupting service to the second segment 712. A fault in the second segment 712 may be transient, in which case the fault protection device may operate to isolate the fault temporarily and then to restore service. However, if the fault is sufficiently large, i.e., high current, or persistent, these efforts to restore service in the second segment 712 may result in melting of the fuse 708 creating a potentially persistent disruption to service on the second segment 712. To reduce this possibility, the operating characteristics of the fault protection device 714 may be set in view of the operating, e.g., minimum melt characteristic, of the fuse 708.

For example, the fuse 708 has a current-based melt characteristic while the fault protection device 714 has a fault protection characteristic, e.g., a fault current operating parameter. The fault protection characteristic may be determined based upon the current based melt characteristic of the fuse 708 such that the fault protection device 714 operates, even if capable of isolating a particular fault of higher current value, only if the fault current is within a determined current value range.

Thus, the current value range may be defined by a lower bound current value and an upper bound current value based upon the fuse melt current and/or the fuse minimum melt current (e.g., roughly the current that melts the fuse in about 4 cycles). The upper bound current value may be a current value that is less than a maximum operating current of the fault protection device. Alternatively, the upper bound current value may be a current value corresponding to a current above which the fault protection device is incapable of preventing melting of the fuse. The lower bound current value may be set to a current value that is approximately 150% of the fuse minimum melt current. Adjustment or correction of the current value range may be made for fault current asymmetry, e.g., based upon current fault reactance-resistance ratio (X/R). Additional considerations will become apparent from the following discussion.

The time-current operating characteristics (TCC) of the fault protection device 714 may be characterized according to the equations set out above. These equations may further be augmented to consider additional parameters such a minimum response cutoff current, maximum response cutoff current and minimum inverse response time providing a TCC model for the fuse 708. The TCC parameters generated from modeling the fuse 708 may then be used to set the fault protection device 714 TCC.

Fuse melt characterization may be based on an adjusted subset of the fuse minimum melt data. The adjusted subset of the data may therefore be referred to as adjusted or intelligent fuse saving (IFS) fuse data. For the fault protection device, e.g., device 714, fuse saving may be set to be active for fault currents between a minimum value and a maximum value defining the current value range, e.g., a modified minimum melt current of the fuse and a maximum current that the fault protection device can isolate before protected fuse melts in some number of cycles. For example, the modified minimum melt current may be set at approximately 150% of the rated minimum melt current, while the maximum current may be set at the current that melts the fuse in about 4 cycles. Thus, fuse data outside this range is irrelevant and can be ignored.

These data may be further adjusted to account for various factors such as preload adjustment, asymmetry and reactance-resistance ratio (X/R). To account for preload adjustment, a correction factor may be applied. For example, the melt time data may be multiplied by 75% to account for 25% preloading of the fuse. The fuse minimum melt current data may be divided by an asymmetry factor to allow the use of symmetrical current data to drive the fault protection device. This is done in lieu of a true RMS current that melts the fuse. The asymmetry factor may be the ratio of the asymmetrical fault current to the symmetrical RMS fault current. The asymmetry factor also depends on the X/R of the fault circuit. Taking into account several reasonable assumptions about feeder X R, source X/R and the available fault currents, and X/R approximation may be made as follows:

$$xr(I_{rms}) := \frac{line_{xr} \cdot substation_{xr}}{substation_{xr} - \frac{I_{rms}}{substation_{available\_fault}} \cdot (substation_{xr} - line_{xr})}$$

The asymmetry factor may then be determined as:

$$Asym_{factor}(I_{rms}, t) := \sqrt{1 + \left[1 - e^{(-2)\frac{\omega \cdot t}{xr(I_{rms})}}\right] \frac{xr(I_{rms})^3}{(1 + xr(I_{rms})^2) \cdot \omega \cdot t}}$$

where $I_{rms}$ is the symmetrical fault current and t is time to melt.

Preferably, characterizing data of various fuses devices may be collected and catalogued. This data may be stored in a user accessible database, or in an automated coordination system, as described above, the data may be stored or associated with one or more intelligent system devices, Thus, a user need only consider: the fuse characteristics based upon its type, manufacturer, speed and ampere rating, whether an optional higher minimum response cutoff current is to be used and an index/curve number that specifies an appropriate fault protection device TCC, e.g., a faster TCC, taking into account coordination with active upstream fault protection devices, as discussed above. Fuses may be characterized in accordance with the equation:

$$t(I_{rms}) = \left(\frac{A}{\left(\frac{I_{rms}}{I_{min-pickup}}\right)^p - C} + B\right) \cdot TD + TS.$$

Figure 8:
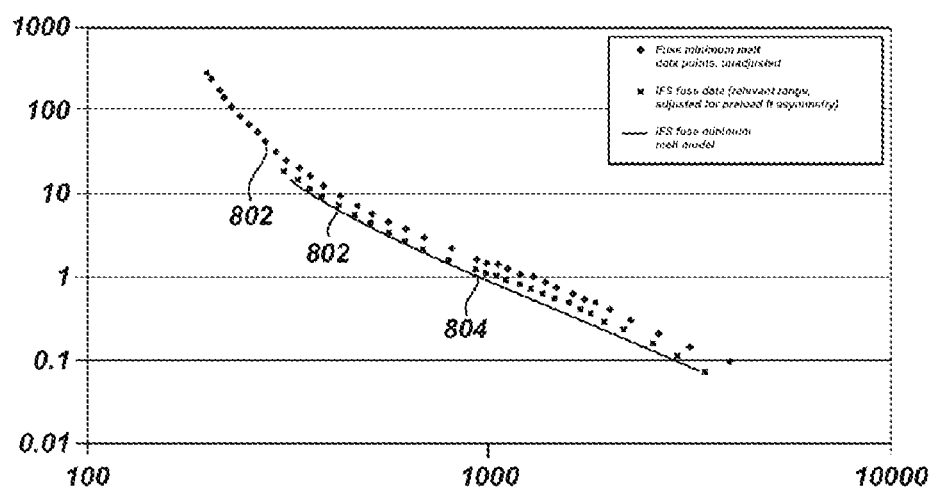

TD may be arbitrarily chosen to be 1. The parameters p, B, TS and C are defined for all conventional fuses having the common characteristics of constant $I^2 \ast t$ to melt at high currents and no response below the minimum melt current, and p may be chosen to be 2, B and TS may be chosen to be 0 and C may be chosen to be 1, forcing $I_{min-pickup}$ to be equal to the fuse minimum melt current. The parameters A and $I_{min-pickup}$ depending on the specific fuse element. The $I_{min-pickup}$ currents may be calculated by solving the TCC equation for any two adjacent IFS fuse data points that are between 150% and 200% of the minimum fuse melt current. In this case, $I_{min-pickup}$ may be taken to be the smallest of the calculated currents. In many cases the $I_{min-pickup}$ will likely be close to the minimum melt current of the fuse, but this is not necessarily so. The parameter A is chosen by dividing the minimum $I^2 \ast t$ (of all of the IFS fuse data points) by the $I_{min-pickup}^2$. The resulting parameters yield a TCC that is below and to the left of the IFS fuse data points for the relevant range of currents. FIG. 8 illustrates unadjusted fuse melt data 802 and corresponding IFS fuse data 804 as modified in accordance with the herein described embodiments for an S&C 100 KSR fuse. The trace 806 shows the TCC as noted moved below and to the left of the IFS fuse data points.

In addition to the fuse saving coordination with reduced service disruption as has been described, the additional herein described techniques of fault protection device coordination may be employed to coordinate N fault protection devices segmenting power distribution lines including fuses. Thus, fault protection devices may provide coordinated fault protection while also providing fuse saving and reducing service disruptions.

In view thereof, a method isolating a fault in a distribution line of a power distribution system may include determining a current value range related to melt characteristics of a fuse also disposed in the distribution line. A response, e.g., a TCC, of the fault protection device may then be set relative to the current value range. For example, the current value range may be bounded by a current value beyond which the fault protection device cannot prevent melting of the fuse, which may be a current value that is less than a maximum operating current of the fault protection device and a current value of approximately 150% of a fuse minimum melt current of the fuse. The current value range may be adjusted for current asymmetry and current fault reactance-resistance ratio (X/R).

A method of generating fuse saving fault protection device response curves in accordance with the herein and additional described embodiments may include starting with fuse data points for a given fuse type to be saved; optionally determining a best fit equation. Given the best fit equation, adjusting the best fit equation downward by the maximum error between the best fit curve and actual fuse data points; multiplying the time values by 0.75 to account for standard fuse derating factors and then adjusting the best fit curve down by a factor to account for the typical fault protection device clearing time, e.g., 0500 seconds to account for the 0.0333 seconds of a typical device. The best fit curve may be further adjusted down by a factor representing fixed time tolerances, e.g., 0.0167 seconds; shifting time values down by a factor, e.g., 4%, for time tolerance; and shifting current values left by a factor to account for current tolerance, e.g., 9%, to account for 4% current tolerance and 5% load tolerance between the fault protection device and the fuse. The minimum response time of the fault protection device may be approximately 0.0167 seconds, which is typical, which corresponds to a point where the IFS fuse data curve flattens out (see FIG. 9). At any current value where the curve is flat, the required margins need not be maintained and the response curve for the fault protection device may be cutoff there.

Figure 9:
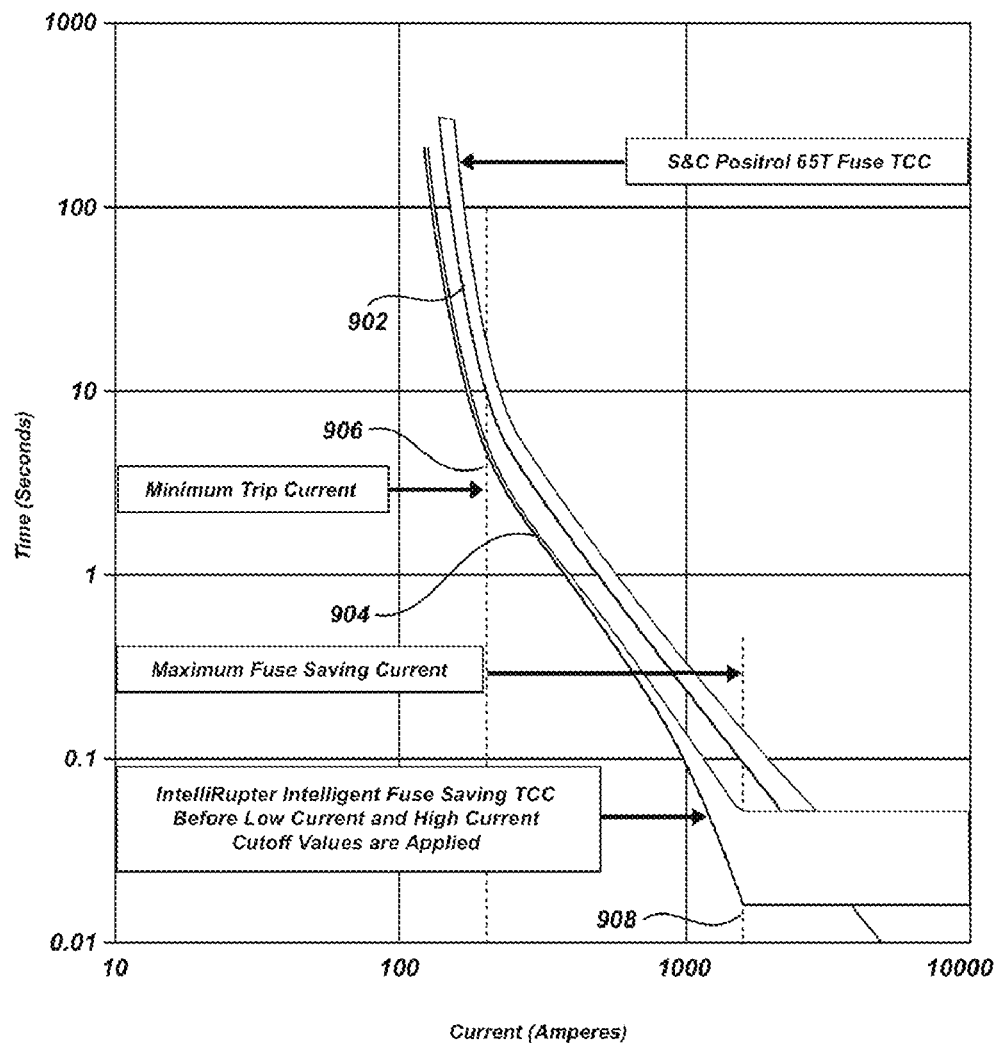
FIGS. 9-12 are plots illustrating time-current characteristics showing fuse data, IFS fuse data and fuse saving TCC profiles.
Figure 10:
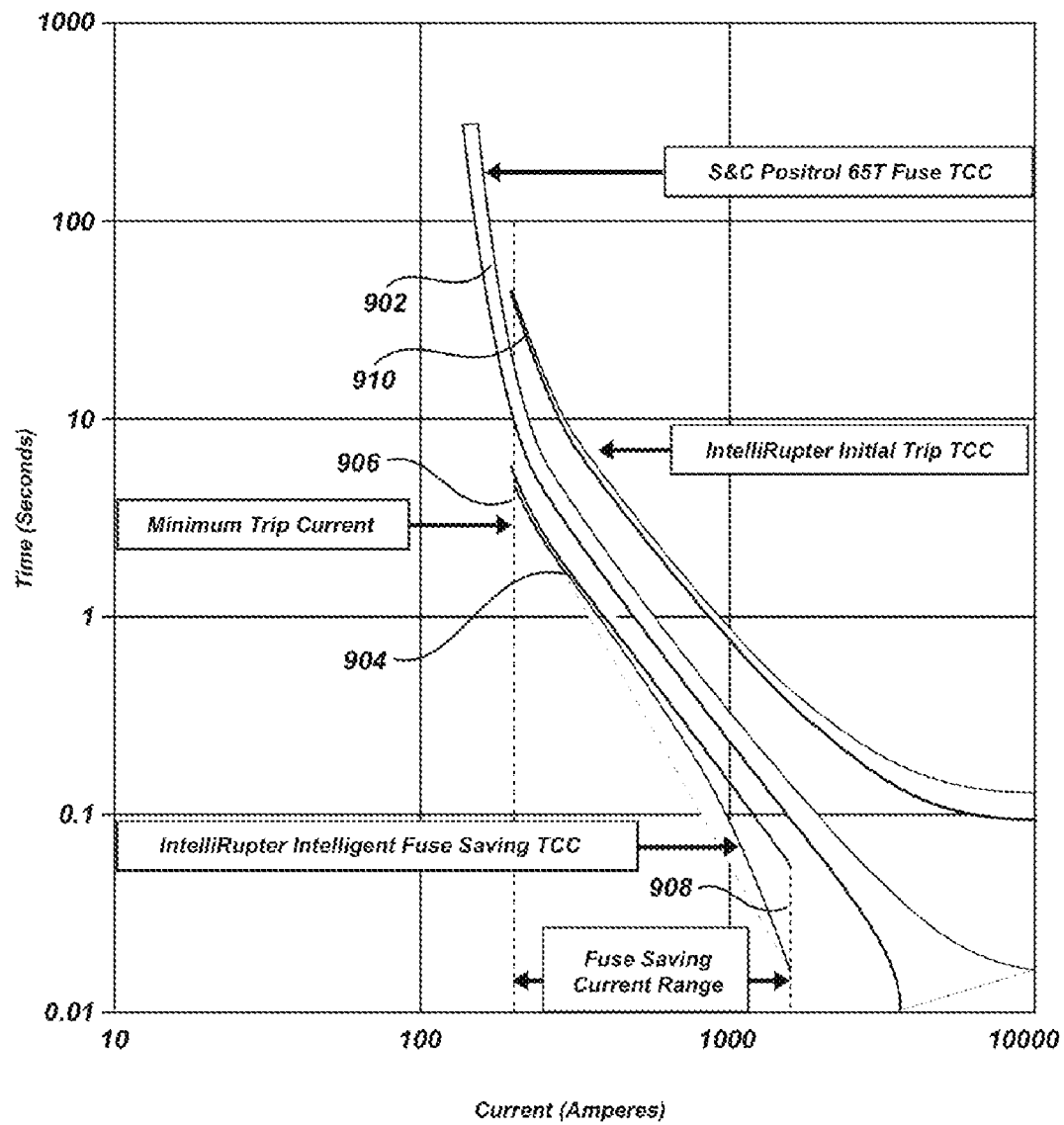
Figure 11:
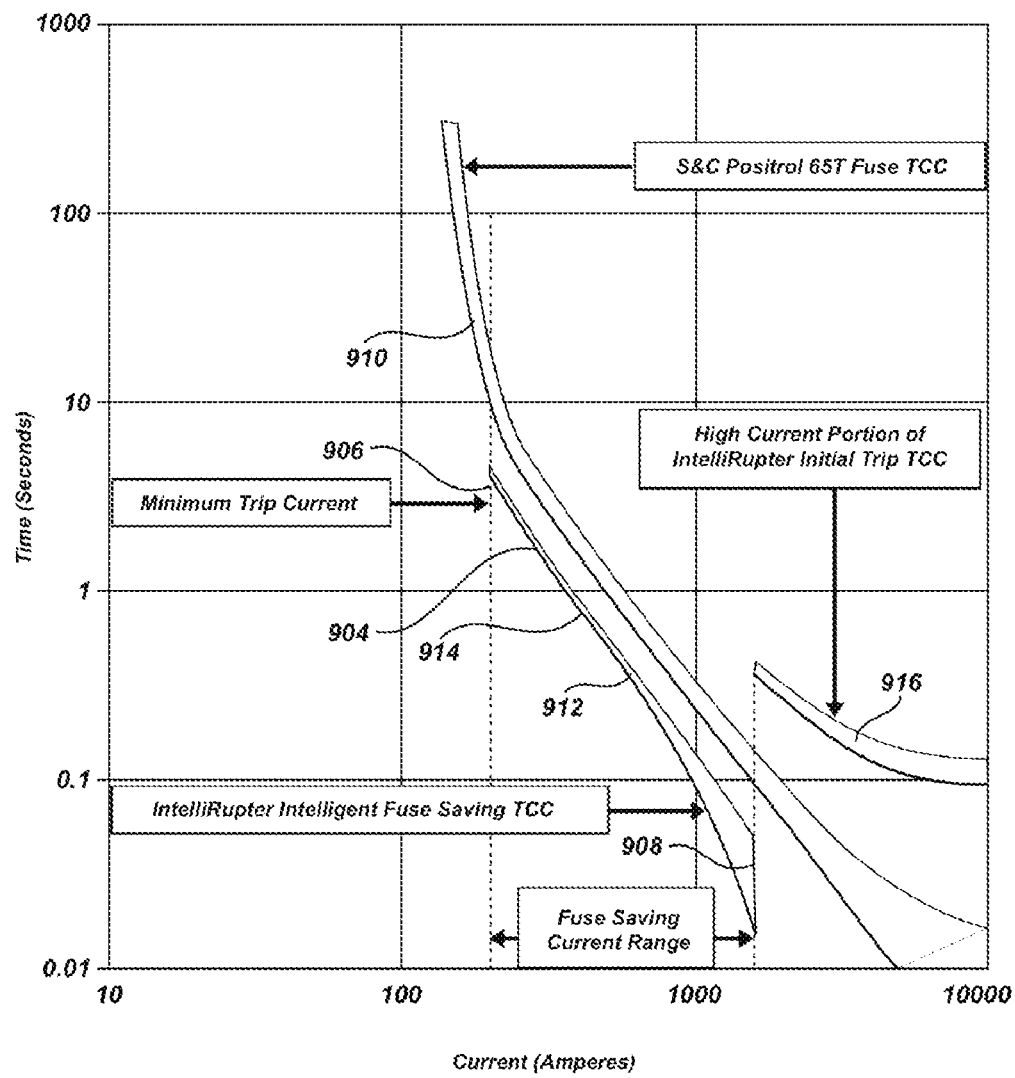
Figure 12:
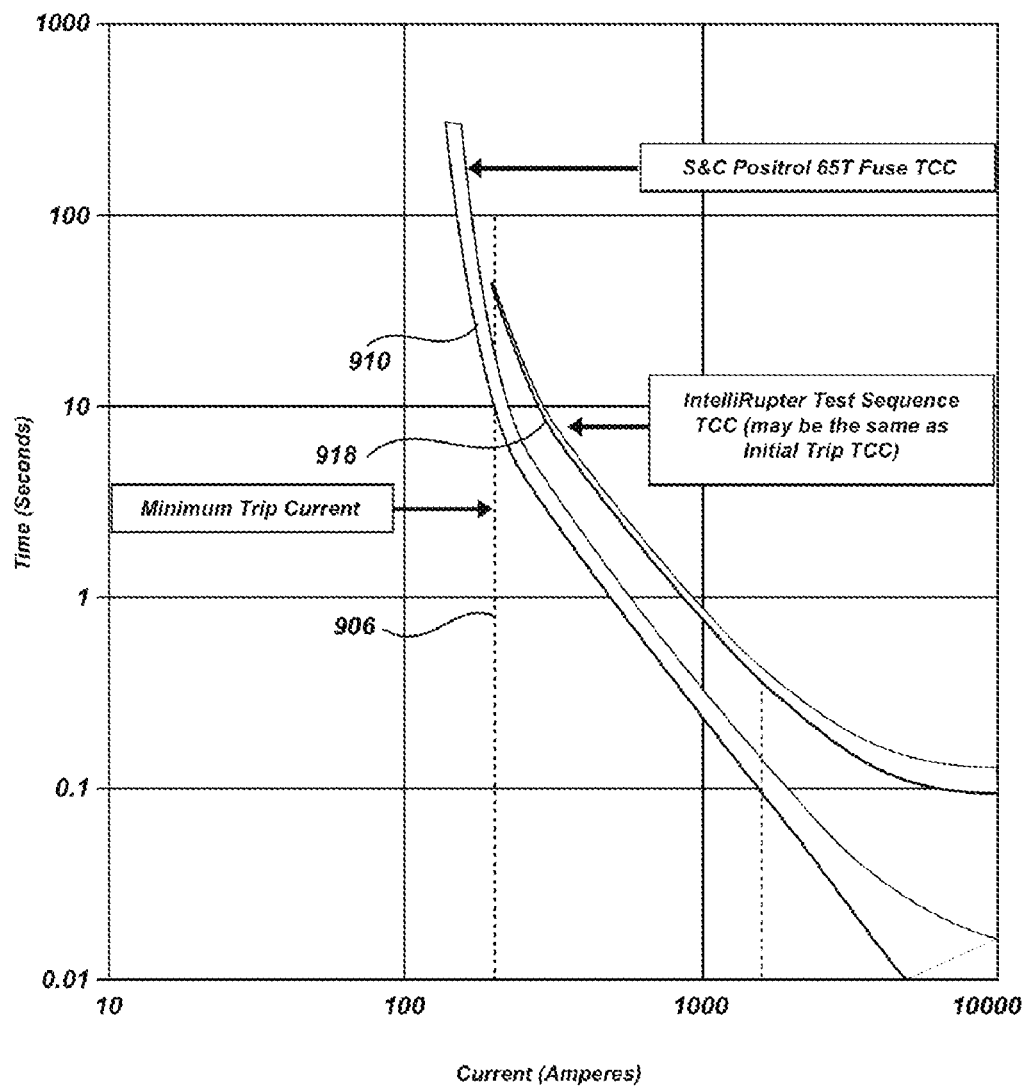

Referring more particularly to FIG. 9 and FIGS. 10-12, IFS TCC curves defining operation of the fault protection device are based upon fuse data points 902. The outcome of the method is a TCC 904 that defines the operation of the fault protection device. As shown in FIG. 9, a low current cutoff 906 may be defined as 150% of the fuse's minimum melt current. A high current cutoff 908 may be defined where the required margins with the fuse data points 902 cannot be maintained. FIG. 10 illustrates both the low current cutoff 906 and the high current cutoff 908. Also shown in FIG. 10 is the TCC 910 of the fault protection device prior to adjustment for fuse saving operation. It should be noted, that the fault protection device may be configured to operate under both the TCC 904 and the TCC 910, for a particular set of operating conditions. In this regard, the fault protection device may be configured to operate with a hybrid curve (912, FIG. 11) having a first portion 914 for fuse saving operation and a second portion 916 for high current operation. Alternatively, the fault protection device may be configured to operate with a fuse saving TCC, e.g., TCC 904, until a first fault operation. After an initial fault operation, the fault protection device may then employ its initial TCC 910 or the hybrid TCC 912 providing fault protection over the full range of potential overcurrent. One will appreciate that after an initial operation, a set number of operations or other criteria, the fault protection device may implement yet another TCC, e.g., a TCC 918 (FIG. 12) specified for service restoration/test sequence operation.

As FIGS. 9 and 10 illustrate, the fault protection device may be configured to implement a first TCC on an initial operation and a second TCC for subsequent operations. Additionally, as described, the fault protection device may employ one or several reclosing strategies, including pulse closing to test the line for a persistent fault prior. In one possible embodiment to implement fuse savings while also reducing service interruptions, an initial or "fast" response curve may be a fuse saving curve, as described. Following one or more unsuccessful reclose attempts indicative of a persistent fault or detection of a persistent fault via pulse closing line testing or the like, a second or "delayed" response curve may be implemented. The initial, fast curve causes the fault protection device to operate before a downline fuse melts or blows. For example, the fault protection device 714 may operate responsive to a fault in section 712 prior to the fuse 708 melting. Operation of the fault protection device 714 interrupts service to both loads 716' and 716" when only load 716" is subject to the fault. On a subsequent operation, or upon determination that the fault is persistent, or upon other operating condition, or by user setting, the fault protection device 714 may implement the second, delayed response curve for subsequent operation. The result is the fault protection device 714 does not operate before the fuse 708 blows/melts isolating the segment 712. Service is restored to the load 716', which was not subject to the fault.

Numerous other multi-curve operating strategies can be envisioned. The fault protection device 714 may provide multiple testing and reclose attempt capability and different and employ one, two or more response curves selected for particular test/reclose attempts in accordance with a service restoration, system protection strategy. One such strategy may take into account whether the initial operation of the fault protection device 714 would satisfy operating curves other than a fast, fuse saving operating curve. If so, the device 714 may then implement pulse testing over conventional closing for subsequent operations to minimize closing into a faulted line. However, if the fault protection device 714 operates in response to a fault only on the fast, fuse saving curve, even though the fault protection device 714 may be capable of pulse testing, it may provide conventional reclosing using a delayed curve to illicit fuse melting fault isolation.

While the invention is described in terms of several preferred embodiments of circuit or fault interrupting devices coordinated to provide fuse saving, it will be appreciated that the invention is not limited to circuit interrupting and disconnect devices. The inventive concepts may be employed in connection with any number of devices including circuit breakers, reclosers, and the like.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A fault protection system for a power distribution system, the power distribution system having a power source coupled to a distribution line and a load coupled to the distribution line being protected by a fuse, the fuse having current-based melt characteristics; the fault protection system comprising:
    a fault protection device coupled to the distribution line between the power source and the coupled load;
    the fault protection device having a first fault protection characteristic and a second fault protection characteristic, wherein the fault protection device is operable responsive to a characteristic of a fault on the distribution line to select one of the first fault protection characteristic and the second fault protection characteristic to isolate the fault in accordance with the selected one of the first fault protection characteristic and the second fault protection characteristic; and
    wherein each of the first fault protection characteristic and the second fault protection characteristic comprises a current value range based upon the current-based melt characteristics of the fuse.

2. The system of claim 1, wherein the current value range for at least one of the first fault protection characteristic and the second fault protection characteristic has a bound based upon a fuse melt current less than a minimum operating current of the fault protection device.

3. The system of claim 1, wherein the current value range for at least one of the first fault protection characteristic and the second fault protection characteristic has a bound based upon a current value corresponding to a minimum current for which the fault protection device is incapable of preventing melting of the fuse.

4. The system of claim 1, wherein the current value range for at least one of the first fault protection characteristic and the second fault protection characteristic has a bound based upon a fuse minimum melt current of the fuse.

5. The system of claim 1, wherein the current value range for at least one of the first fault protection characteristic and the second fault protection characteristic has a bound based upon a current value of approximately 150% of a fuse minimum melt current of the fuse.

6. The system of claim 1, wherein the current value range for at least one of the first fault protection characteristic and the second fault protection characteristic has a bound based upon a fuse minimum melt current of the fuse adjusted for current asymmetry.

7. The system of claim 1, wherein the current value range for at least one of the first fault protection characteristic and the second fault protection characteristic has a bound based upon a fuse minimum melt current of the fuse adjusted for current fault reactance-resistance ratio (X/R).

8. The system of claim 1, wherein the current value range for at least one of the first fault protection characteristic and the second fault protection characteristic comprises a user determined current value range.

9. The system of claim 1, wherein the fault protection device segments the distribution line into a first segment between the power source and the fault protection device and a second segment extending from the fault protection device, the fault protection device is operable responsive to the selected one of the first fault protection characteristic and the second fault protection characteristic to isolate the second segment from the first segment.

10. A method of isolating a fault in a distribution line of a power distribution system, the distribution line being coupled to a power source and a fault protection device coupled to the distribution line between the power source and a load coupled to the distribution line protected by a fuse, the method comprising:
    determining a current value range based upon a fuse melt characteristic of the fuse,
    setting a first response of the fault protection device such that the first response is restricted to operating upon currents within the current value range;
    setting a second response of the fault protection device such that the second response is unrestricted to operating upon currents within the current value range;
    selecting one of the first response and the second response based upon a characteristic of the fault; and
    isolating the fault in accordance with the selected one of the first response and the second response.

11. The method of claim 10, wherein determining a current value range comprises determining a bound of the current value range based upon the fuse melt characteristic.

12. The method of claim 10, wherein determining a current value range comprises determining a bound of the current value range corresponding to the fuse melt characteristic that is less than a maximum operating current of the fault protection device.

13. The method of claim 10, wherein determining a current value range comprises determining a bound of the current value range corresponding to a maximum current for which the fault protection device is incapable of preventing melting of the fuse.

14. The method of claim 10, wherein determining a current value range comprises determining a bound of the current value range that is based upon a fuse minimum melt current of the fuse.

15. The method of claim 10, wherein determining a current value range comprises determining a bound of the current value range that is approximately 150% of a fuse minimum melt current of the fuse.

16. The method of claim 10, wherein determining a current value range comprises determining a bound for the current value range based upon a fuse minimum melt current of the fuse adjusted for current asymmetry.

17. The method of claim 10, wherein determining a current value range comprises determining a bound for a current value range based upon a fuse minimum melt current of the fuse adjusted for current fault reactance-resistance ratio (X/R).

18. The method of claim 10, wherein determining a current value range comprises user selecting the current value range.

19. The method of claim 10, wherein the first response of the fault protection device comprises a first response characteristic to provide fuse savings and the second response of the fault protection device comprises a second response characteristic to provide high current fault protection.

20. The method of claim 10, wherein the first response of the fault protection device comprises a first response characteristic to provide fuse savings and the second response of the fault protection device comprises a second response characteristic to provide normal operation fault protection characteristics.

21. The method of claim 10, wherein the first response of the fault protection device and the second response of the fault protection device comprises respective first and second portions of a hybrid response characteristic.

22. The method of claim 21, wherein the hybrid response first portion is a fuse saving characteristic.

23. The method of claim 21, wherein the hybrid response first portion is a normal response characteristic for the fault protection device.

24. The method of claim 21, wherein the hybrid response second portion is a fuse melting characteristic.

25. The fault protection system of claim 1, wherein the first fault protection characteristic comprises a fuse saving fault protection characteristic and the second fault protection characteristic comprises a fuse melting fault protection characteristic.

26. The fault protection characteristic of claim 1, wherein the first fault protection characteristic comprises a first portion of a hybrid response characteristic and the second fault protection characteristic comprises a second portion of the hybrid response characteristic.

27. The fault protection system of claim 26, wherein the hybrid response first portion is a fuse saving characteristic.

28. The fault protection system of claim 26, wherein the hybrid response second portion is a fuse melting characteristic.

* * * * *